2,899,416

CATALYST COMPOSITIONS COMPRISING A TITANIUM DIHALIDE

Ralph Courtenay Schreyer, Wilmington, Del., assignor to E. I. du Pont de Nemours and Company, Wilmington, Del., a corporation of Delaware No Drawing. Application September 30, 1954
Serial No. 459,547

2 Claims. (Cl. 260—94.9)

This invention relates to novel catalyst compositions which are effective for polymerization of ethylene and other polymerizable compounds, especially those containing a terminal methylene group. The invention also relates to a novel process for polymerizing olefins, especially ethylene.

Polymerization of olefins in the presence of inert solvents and various catalysts comprising metal halides has long been known, and the literature pertaining to such polymerization processes have been very extensive. In comparatively recent years there has been a recognition of the fact that polymerization processes performed in the presence of active metal halides, are very markedly influenced by combinations of catalyst components. For example, in the Reid patent, U.S. 2,355,925 a polymerization process was disclosed wherein liquid polymers were produced from olefins in the presence of aluminum chloride, zirconium chloride or titanium chloride in the presence of alkaline earth metals, alkali metals, oxides of alkali or alkaline earth metals, alkali metal alloys, or other such agents which react with hydrogen chloride (cf. also the Reid Patent 2,427,303). Friedel-Crafts halides, modified by reaction with alcohols, have similarly been employed (Young, U.S. 2,440,498). Isoolefin polymerization has been carried out in the presence of mixed halides, such as $TiOCl_2 \cdot 4AlBr_3$, to give high molecular weight products (U.S. 2,481,273). Similar combinations of catalyst components have also been used in making tacky semi-solid polypropylene (Young, U.S. 2,542,610). Active metal halides including titanium tetrachloride, in combination with various complexing agents, such as ethers, or sulfur dioxide, have been used in the preparation of isobutylene polymers, etc. (cf. Dornte and McKay U.S. 2,536,841; Dornte U.S. 2,559,062; Sparks and Young, U.S. 2,549,539). Ethylenically unsaturated compounds have been polymerized in the presence of $TiCl_4$ and oximes (Howard, U.S. 2,567,109). Solid polymers of ethylene have been prepared at temperatures of 130° to 180° in the presence of three-component catalysts, containing (1) aluminum chloride, (2) titanium tetrachloride and (3) a metal, such as aluminum (Fischer, French Patent 874,215/53). Ziegler (French Patent 1,049,-371/53) employed as polymerization catalysts certain compounds of aluminum, gallium, indium or beryllium of the formula $M(R)_n$, $n$ being 2 or 3, R being hydrogen, a saturated monovalent aliphatic group or a monovalent aromatic group, and thereby obtained rapid polymerization of ethylene. The product obtained at 180° C., under 500 atmospheres pressure contained low molecular weight polymers, but by varying the conditions Ziegler also produced high molecular weight, solid polyethylenes.

In the copending United States patent application of Anderson, Bruce, Merckling, and Truett, S.N. 450,243, filed August 16, 1954, it was disclosed that ethylene can be polymerized rapidly at room temperature and atmospheric pressure to form a polymer of exceptionally high quality, by use of a catalyst made by reducing titanium tetrachloride with a substantial excess of ethyl magnesium bromide.

The advances hereinabove reported, when considered in toto, have constituted a major change in the olefin polymerization art, as compared with earlier processes employing free radical types of catalysts (U.S. Patents 2,212,155, 2,475,520, 2,467,234) or hydrogenation catalysts, promoted with alkali metals or alkali metal hydrides (British Patent 536,102).

The present invention is directed to further improvements in the olefin polymerization art, beyond those described hereinabove.

The patents which have issued prior to the present application, and which have disclosed combinations of metal halide catalysts where one of the components is a titanium halide, have apparently failed to suggest that the valence state of the titanium is an important criterion in determining the rate of production of polymer and the nature of the polymer which is formed.

It has been discovered by the present applicant that in such processes the valence state of the titanium is quite important, and, more particularly, that rate of polymerization of olefins in the presence of mixed metal halides one of which is a titanium halide, is greatly affected by the valence state of the titanium. So pronounced is this effect that by reducing the valence of the titanium in a titanium halide-aluminum halide catalyzed olefin polymerization, it is now possible to achieve results which compare very favorably with those reported in the above-mentioned process employing the more expensive type of $AlCl_3TiCl_4$—$M(R)_n$ catalyst. More especially, it has been discovered by the present applicant that without the use of any organometalic compound or metal hydride as promoter, the mixed metal halides, particularly aluminum halide-titanium halide in combination, are highly effective catalysts for rapid conversion of ethylene to solid polymers, provided the titanium is present in a low valence state, e.g. 2. Actually, $TiCl_2$, alone, is an effective catalyst for converting ethylene to solid polymers, but when $TiCl_2$ is used in combination with $AlCl_3$, the rate of reaction is of the order of magnitude of ten times as fast as with $TiCl_2$ alone.

$TiCl_2$ or $TiBr_2$ can be employed in pure form, in the practice of this invention, but this is not at all essential. Impure varieties containing titanium metal are highly effective catalysts, catalysts of exceptionally high activity in the manufacture of solid ethylene polymers contain $AlCl_3$, $TiCl_2$ and Ti metal. Auxiliary catalysts which can be used in combination with $TiCl_2$ or $TiBr_2$ include Ti metal, Al metal, and aluminum halides, or any combination of these. The relative proportions of the catalyst components can be varied over a wide range.

The invention is further illustrated by means of the following examples:

*Example I.*—Ethylene was heated in a pressure-resistant vessel of 330 ml. capacity at 198–200° C. under a pressure of 1000 pounds per square inch, in the presence of 2 grams of a catalyst containing about one-third $TiCl_2$ and two-thirds Ti metal, said catalyst being suspended in 100 ml. of xylene. Ethylene polymer was produced at the rate of 5 grams per hour (melt index of the polyethylene, 0). A similar experiment was made at 75°, and no polymer was formed. In a corresponding experiment using the same catalyst at 245° to 250 C. (1650 pounds per square inch; weight of catalyst, 4 grams), the weight of polyethylene formed was only 2.5 grams during 2 hours of operation. The melt index of the latter polyethylene was 0.247. In a comparative experiment using 2 grams of the same catalyst, 100 ml. of cyclohexane and 2 ml. tri(n-butyl)amine (198° to 200°, 1000 pounds per square inch, one hour), the quantity of polyethylene formed was 8 grams. The polyethylene was quite tough, and had a density of 0.96. It had a melt index of zero.

*Example II.*—Ethylene was polymerized in the presence of 100 cc. cyclohexane, 2 grams crude $TiCl_2$, and 5.3 grams $AlCl_3$ at 75° to 78° C. under a pressure of 1000 pounds per square inch for 2 hours. The polyethylene thus obtained weighed 21 grams. This product was a solid polymer, but was evidently of lower molecular weight than the polymers obtained in the preceding example.

It is to be understood that the foregoing examples are illustrative only, and that numerous variations can be made in the procedure which is employed. The polymerization temperatures can be much lower when the catalyst contains both $TiCl_2$ and Al or $AlCl_3$ than when $TiCl_2$ is used in the absence of Al, $AlCl_3$ or other similar component. Pressures can be varied very widely and are not particularly critical.

The inert solvent can also be varied widely, hydrocarbons which are liquid under the reaction conditions being the preferred solvents. Cycloalkanes, alkanes, toluene, xylenes, and other hydrocarbons which are substantially free of non-aromatic-olefinic and acetylenic unsaturation are most suitable. Generally, the reaction medium is a suspension of the catalyst components in a fluid hydrocarbon or other inert fluid which is liquid under the reaction conditions.

The titanium dihalide which is employed in the practice of this invention can be made by known methods. For example, titanium metal can be treated with chlorine at 300°–400° to produce $TiCl_2$. Traces of $TiCl_3$ and $TiCl_4$ can be removed from $TiCl_2$ by heating at 500° C. The $TiCl_2$ thus obtained is coal black and gives off hydrogen when brought into contact with water.

The ethylene which is employed should preferably have a very low moisture content, suitable not in excess of 20 parts per million.

The quantity of catalyst employed can be varied over a wide range, a suitable quantity being 0.1 to 20% based on the weight of inert liquid medium.

Generally speaking, when the catalyst contains an aluminum halide as an auxiliary component, the character of the polymer depends in part upon the ratio of Al halide to Ti dihalide in the catalyst. When the content of $AlCl_3$ is high, the average molecular weight of the polyethylene is frequently low. Polyethylene of the desired melt index can thus be obtained by varying the reaction conditions.

The invention is especially useful in the manufacture of ethylene homopolymers and interpolymers, but it is valuable also in making polymers from other olefinic materials, especially those having terminal methylene groups, such as butadiene, propylene, butene-1, styrene, etc.

What is claimed is the following:

1. A medium in which to carry out polymerizations, consisting essentially of an inert liquid hydrocarbon, titanium dichloride and a member of the class consisting of titanium metal and aluminum trichloride, said member being synergistic with said titanium dichloride and present in quantity not in excess of twice the quantity of titanium dichloride when said member is titanium metal, nor in excess of 2.65 times the quantity of titanium dichloride when the said member is aluminum trichloride.

2. The process which comprises polymerizing ethylene in the presence of the catalyst of claim 1.

References Cited in the file of this patent

UNITED STATES PATENTS

| | | |
|---|---|---|
| 1,939,005 | Guthke | Dec. 12, 1933 |
| 2,542,610 | Young et al. | Feb. 20, 1951 |

FOREIGN PATENTS

| | | |
|---|---|---|
| 874,215 | Germany | Apr. 20, 1953 |

OTHER REFERENCES

Gilman: J. Organic Chem., 1949, pages 505–515.

Ruff: Zeitschrift für Anorganische Chem., vol. 128, page 94 (1923).